Dec. 18, 1945.  C. WOLF  2,391,286
FALLING SAW
Filed Jan. 18, 1943
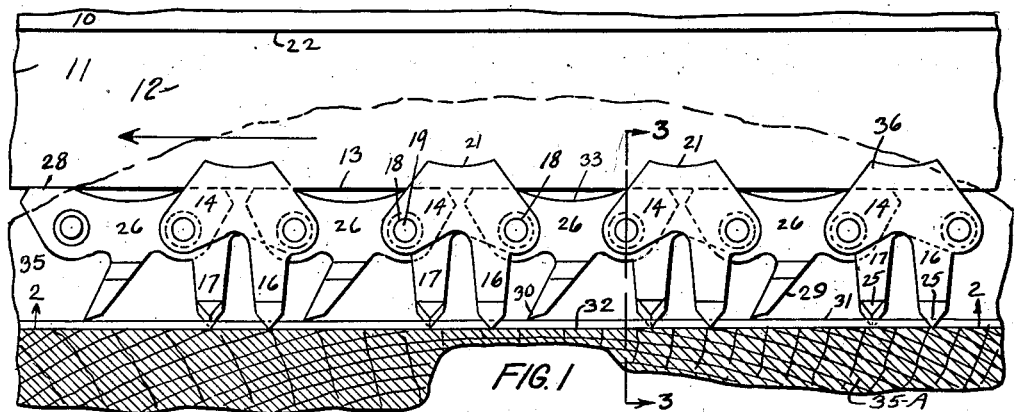
FIG. 1
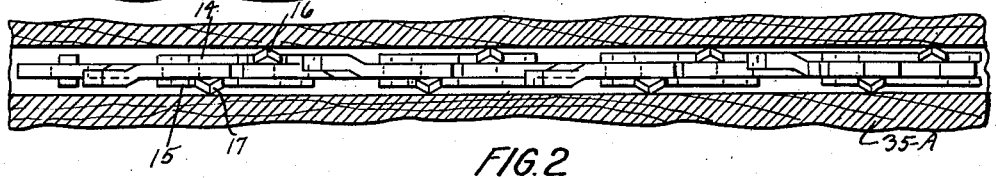
FIG. 2
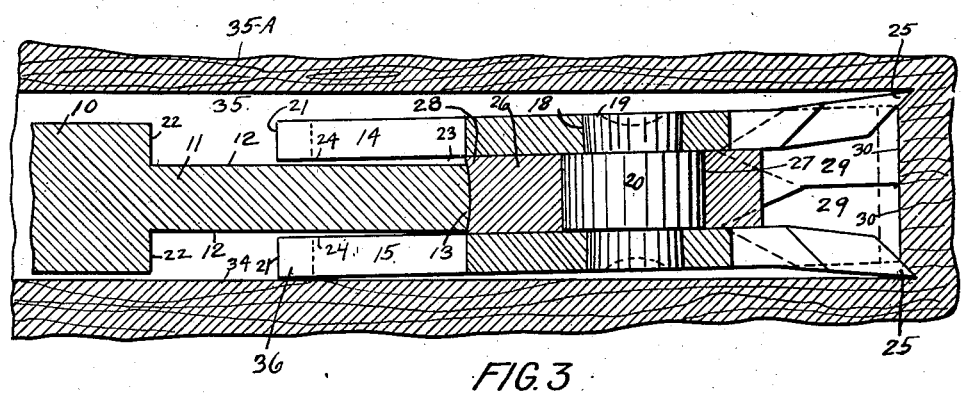
FIG. 3
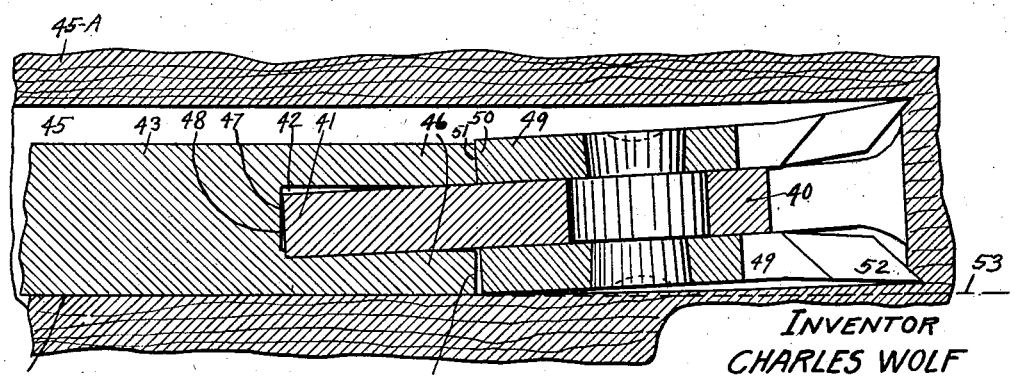
PRIOR ART  FIG. 4
INVENTOR
CHARLES WOLF
By
ATTORNEY Patented Dec. 18, 1945

2,391,286

UNITED STATES PATENT OFFICE 2,391,286

FALLING SAW

Charles Wolf, Portland, Oreg.

Application January 18, 1943, Serial No. 472,710

6 Claims. (Cl. 143—135)

This invention relates generally to chain saws, and particularly to a falling saw.

The main object of this invention is to construct an improved form of falling saw of the general class illustrated in my co-pending patent application, Ser. No. 328,627, over which the saw described herein is an improvement due to its greater saw dust carrying capacity, lesser weight per foot of chain length, less material required in the manufacture of the raker teeth, and the elimination of the tendency of saw dust to wedge under the trailing raker tooth by the elimination of the trailing tooth itself.

The second object is to construct a saw of the class described which will be especially adapted for falling, owing to a definite relationship between the clearance of the saw in the cut, and the tolerance permitted in the fits between the saw chain and the frame upon which it is mounted.

The third object is to construct a falling saw of the chain type in which the interaction between the saw frame and the saw chain is so advantageous as to minimize the wear which normally occurs in the parts thereof.

The fourth object is to construct a saw of the class described in which there will be a material tendency for the saw to cut in a straight horizontal plane.

The fifth object is to construct a saw of the class described in which the under sides of the lowermost cutter teeth serve to rest upon the lower side of the saw slot and to have their innermost intermediate point serve as a point of contact with the frame itself, whereby the pressure per square inch on the wearing parts is reduced to a minimum.

The sixth object is to construct a falling saw of the class described wherein the chain is permitted to rock transversely on the transporting frame without setting up a binding action on the frame itself, thereby enabling the chain to form a substantially horizontal cut in a straight plane.

The seventh object is to add to the life of the saw by reducing the wear on the chain and frame due to the free running action of the parts thereof.

The eighth object is to so relate the saw frame and chain that the length of the cutter link constitutes a beam supported at both ends against the sides of the saw cut, while the load from the frame rests between the supported ends.

The ninth object is to eliminate the spreading action commonly found in saws of the chain type.

These and other objects are accomplished in the manner set forth in the following specification, as illustrated in the accompanying drawing, in which:

Fig. 1 is a fragmentary section through a short length of chain saw and its supporting frame, showing a portion of a saw slot in section.

Fig. 2 is a section taken along the line 2—2 in Fig. 1.

Fig. 3 is a transverse section taken along the line 3—3 in Fig. 1.

Fig. 4 is a view similar to Fig. 3, but showing a prior art condition.

Similar numerals refer to similar parts throughout the several views.

Referring in detail to the drawing, there is shown a saw frame 10 having a narrow track 11 formed thereon, whose sides 12 are parallel and whose edge 13 is preferably rounded as shown.

The saw chain itself consists of pairs of cutter links 14 and 15 which are identical in form and are used right and left in order that the teeth 16 and 17 will not be opposite each other—that is, the teeth 16 and 17 are not midway between the holes 18 in which are riveted the reduced ends 19 of the rivet bodies 20.

Each cutter link 14 and 15 has a somewhat rounded base 21 which conforms to the rounded end of the saw frame (not shown), its function being to support the chain on its turns.

It will be noted that the curved bases 21 are remote from the shoulders 22 of the frame 10, it being intended that they shall never come in contact.

It will also be noted that the links 14 and 15 are held apart by the rivet bodies 20 to provide what appears to be an abnormal clearance 23 between the inner faces 24 and the outer faces 12 of the track 11. The teeth 16 and 17 are provided with cutting points 25. The purpose of the clearance 23 will be set forth presently.

Raker links 26 are provided with holes 27 to receive the rivet bodies 20, and thereby connect the cutter links in a manner which is well understood. The raker links 26 are elongated to form a base 28 which extends beyond the rivet holes 27 for reasons set forth in the co-pending application above identified. Each raker link 26 is provided with a raker tooth 29, which is offset in parallelism with the side of the raker link itself. It will be understood that the term "off-set" is used to describe the parallel condition of the raker tooth with relation to the raker link as opposed to the usual angular set of the points 25.

It will be noted that the chisel shaped point 30 of each raker tooth 29 is extended to the raking line 31 which is somewhat back from the cutting line 32, the separation of these lines depending upon the kind of wood being cut, speed of operation, and other factors.

An inspection of Figs. 1 and 2 discloses the fact that there is a tortuous channel formed between the cutter teeth 16 and 17 and on the sides of the raker links 26.

In the present instance, the cubical capacity of this channel is increased over the type shown in the co-pending application, due to the fact that there is but one raker tooth 29 on each raker link 26, and the action is further improved by the fact that when two raker teeth are employed on a given link for the purpose of making the saw reversible, the trailing link obviously affords a V shaped pocket into which particles can wedge.

While the raker tooth point 30 is illustrated as being chisel shaped, it is obvious that this can assume any other form without departing from the spirit of the invention.

It will be noted that the intermediate portion 33 of each raker link base 28 is curved on a somewhat larger radius than are the curves 21 in order to enable same to pass around the corresponding portion of the track 11. It will also be noted by referring to Fig. 3, that each link 26 has its base 28 rounded to conform to the rounded edge 13 of the track 11 in order to permit a limited amount of rocking by the chain on the track 11, and it will be noted in Fig. 3, which represents a falling cut, that the saw frame 10 does not rest upon the bottom 34 of the cut 35 being formed in the log 35—A, but it does rest upon the intermediate point of the side 24 of the cutter link 15 whose point 25 and base 36 rest against the cut side 34, enabling the track 11 to hold the saw chain in an ideal and free running relationship at all times, and importantly, to hold the point 25 accurately to the plane of the cut side 34.

Referring now to the prior art condition illustrated in Fig. 4, in which the chain does not straddle the track but in which the raker link 40 is provided with a base 41 which extends into the raceway 42 and in which the frame 43 rests against the lower side 44 of the cut 45 being formed in the log 45—A. Here a different condition exists in which the base 41 of the raker tooth 40 attempts to spread apart the sides 46 of the frame 43. In such saws, the clearance between the frame members 46 and the raker tooth base 41 is held to a minimum, and the bottom 47 of the base 41 bears against the bottom 48 of the raceway 42.

In this form of the device, the cutter links 49 have their bases 50 bearing against the track edges 51 on each side of the raceway 42. However, as the cut proceeds, and the weight of the saw frame 43 rests upon the surface 44, the lowermost cutter teeth 52 which are remote from the bases 50, exert a leverage against the wearing surface bringing about a wearing condition shown in Fig. 4, which condition is aggravated by the fact that the contact between the members 50 and 51 on the top side of the frame 43 serves as a fulcrum to increase the spreading action. As this wear develops, it permits the saw chain to leave its normal cutting plane 53 and cut a curved line as shown; and while this alone is only slightly objectionable, the serious objection resides in the fact that the following of this curved cutting line continues to maintain the wearing action on the parts until the saw itself is destroyed. In the meantime, an objectionable amount of power has been consumed in driving the saw instead of being employed in actual sawing.

It will be noted that by straddling the track as shown in Figs. 1 and 2, and providing an excessive clearance on the sides of the track and further shaping the raker link bases so as to encourage transverse rocking on the track, that the saw is not only made to operate with the least amount of effort, and internal stress, but also there is provided a relatively great amount of clearance for sawdust. Not only does the chain itself act as a cutting conveyor, but the space between the link bases 21 and the shoulder 22 also affords a passageway for dust. Furthermore, the use of a single tooth increases the clearance for sawdust, eliminates the wedging action of the dust under the trailing tooth, and lightens the chain itself; and the life of the chain is not halved by the reduction in the number of raker teeth since the teeth which are employed operate to the best advantage. The elements herein described are so inter-related and dependent upon each other as to require their joint use to obtain the maximum amount of utility from the device.

I claim:

1. A falling saw having in combination a transversely convex track, a block link saw chain having pairs of side links straddling the track and having the track engaging edges of the block portions transversely concave to fit said track, the clearance between the outer sides of the track and the inner sides of the side links being sufficient to permit the lowermost of said side links to ride upon the under side of a cut while the outer edge only of the track portion rests upon the top sides of the lowermost cut engaging links while the saw is in a tree falling position.

2. In a falling saw, the combination of a longitudinal frame, around which frame is formed a narrow endless track, the outermost edge of which is transversely convex, a saw chain straddling said track whose width is substantially wider than the thickness of said frame and whose track engaging portion is transversely concave to fit said track, said track and chain having excessive lateral clearance between same adapted to permit the chain to rock laterally a limited amount on said track.

3. A falling saw having a transversely rigid elongated frame, a narrow gauge track formed along the edge of said frame and thinner than is said frame, a saw chain having elongated raker teeth links thicker than is said track and slidable thereon, pairs comprising upper and lower cutting teeth links uniting said raker teeth links and having portions thereof extending along the side of the track and normally spaced therefrom, the contacting portions of said track and raker links being curved transversely, that of the track being convex and that of the raker teeth links being concave, whereby the chain is enabled to rock transversely a limited amount upon said track in order that the points and the opposite edges of the lower cutting links may rest upon the bottom of the cut while the points only of the upper cutter links engage the top of the cut, and wherein the underside of the outermost track portion only rests upon the upper side of the lowermost cutter links, while the frame is spaced from the sides of the cut.

4. A falling saw having a transversely rigid elongated frame, a narrow gauge track formed along the edge of said frame and thinner than is said frame, a saw chain having elongated raker links thicker than is said track and slidable thereon, each of said raker links having one forwardly inclined raker tooth extending therefrom, pairs comprising upper and lower cutting teeth links uniting said raker teeth links and having portions thereof extending along the sides of the track and normally spaced therefrom, the contacting portion of said track and raker teeth links being curved transversely, that of the track being convex and that of the raker teeth links being concave, whereby the chain is enabled to rock transversely a limited amount upon said track in order that the points and the opposite edges of the lower cutter links may rest upon the bottom of the cut while the points only of the cutter links engage the top of the cut, and wherein the under side of the outermost track portion only rests upon the upper side of the lowermost cutter links while the frame is spaced from the sides of said cut.

5. A falling saw having a frame adapted to pass freely into the saw cut, a narrow gauge track of less width than said frame disposed around the lateral edge of the frame, elongated raker teeth links disposed around said track and exceeding same in thickness, pairs of cutter teeth links joining opposite sides of said raker teeth links and straddling said track in a manner to provide a substantial amount of lateral clearance for the purpose of permitting a limited amount of lateral rocking of the chain, the contacting edges of said links and track being respectively convexly and concavely curved to match each other, said cutter links having their teeth set to flare outwardly in a manner such that the points and opposite edges of the lowermost cutter teeth of the saw will ride on the bottom of a horizontal cut while only the outermost portions of the track will rest upon the top sides of the lower cutter teeth between the points and bases thereof.

6. A falling saw having a frame adapted to pass freely into a saw cut, a narrow gauge track of less thickness than has said frame, disposed along the lateral edge of the frame, elongated raker teeth links disposed around said track and exceeding same in thickness, each of said raker teeth links having a forwardly inclined raker tooth projecting therefrom, pairs of cutter links joining opposite sides of said raker links and straddling said track in a manner to provide a substantial amount of lateral clearance for the purpose of permitting a limited amount of lateral rocking of the chain, said cutter links having their teeth set to flare outwardly in a manner such that the points and opposite edges of the lowermost cutter teeth of the saw will ride on the bottom of a horizontal cut while only the outermost portions of the track will rest upon the top sides of the lower cutter teeth between the points and bases thereof, the contacting edges of said links and track being transversely curved on a radius lying within the cutting plane and on the track side of the links.

CHARLES WOLF.